(12) United States Patent
Wan et al.

(10) Patent No.: US 10,477,610 B2
(45) Date of Patent: Nov. 12, 2019

(54) DATA TRANSMISSION METHOD, ACCESS NETWORK DEVICE, AND COMMUNICATION SYSTEM

(71) Applicant: Huawei Technologies Co., Ltd., Shenzhen (CN)

(72) Inventors: Lihong Wan, Shanghai (CN); Lei Deng, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 53 days.

(21) Appl. No.: 15/715,917

(22) Filed: Sep. 26, 2017

(65) Prior Publication Data

US 2018/0020456 A1 Jan. 18, 2018

Related U.S. Application Data

(63) Continuation of application No. PCT/CN2015/075232, filed on Mar. 27, 2015.

(51) Int. Cl.
*H04W 4/00* (2018.01)
*H04W 76/20* (2018.01)
(Continued)

(52) U.S. Cl.
CPC ........... *H04W 76/20* (2018.02); *H04W 72/08* (2013.01); *H04W 76/11* (2018.02); *H04W 76/27* (2018.02); *H04W 48/08* (2013.01); *H04W 48/20* (2013.01)

(58) Field of Classification Search
CPC ..... H04W 48/02; H04W 48/08; H04W 48/20; H04W 72/08; H04W 76/02;
(Continued)

(56) References Cited

U.S. PATENT DOCUMENTS 8,514,786 B2 * 8/2013 Okabe .................... H04W 8/02
370/328
9,060,374 B2 * 6/2015 Okabe .................... H04W 76/38
(Continued)

FOREIGN PATENT DOCUMENTS

CN 101166296 A 4/2008
CN 102860052 A 1/2013
(Continued)

OTHER PUBLICATIONS

Stewart et al, Stream Control Transmission Protocol, RFC 2960, 134 pages, Oct. 2000.*
(Continued)

*Primary Examiner* — Frank Duong
(74) *Attorney, Agent, or Firm* — Slater Matsil, LLP (57) ABSTRACT

A data transmission method, an access network device, and a communications system are provided. The access network device obtains, from a first core network (CN) element through a control plane interface, information about a bearer that needs to be established, establishes the bearer according to the information about the bearer, and notifies, through the first CN element, the established bearer to a second CN element for use. When a signal of the control plane interface is interrupted, the access network device transmits to-be-transmitted data in an existing service of UE by using the established bearer.

9 Claims, 5 Drawing Sheets

(51) Int. Cl.
*H04W 76/11* (2018.01)
*H04W 76/27* (2018.01)
*H04W 72/08* (2009.01)
*H04W 48/08* (2009.01)
*H04W 48/20* (2009.01)

(58) Field of Classification Search
CPC . H04W 76/021; H04W 76/04; H04W 76/046; H04W 76/11; H04W 76/20; H04W 76/27; H04W 76/30
See application file for complete search history.

(56) References Cited

U.S. PATENT DOCUMENTS

| | | | |
|---|---|---|---|
| 9,155,121 B2* | 10/2015 | Rayavarapu | H04W 76/19 |
| 9,641,415 B2* | 5/2017 | Stoyanov | H04L 43/10 |
| 2011/0177820 A1 | 7/2011 | Westroos et al. | |
| 2012/0076079 A1 | 3/2012 | Motohashi et al. | |
| 2012/0120788 A1 | 5/2012 | Hu | |
| 2012/0184275 A1 | 7/2012 | Okabe et al. | |
| 2012/0202532 A1 | 8/2012 | Okabe et al. | |
| 2015/0119049 A1 | 4/2015 | Isobe et al. | |

FOREIGN PATENT DOCUMENTS

| | | |
|---|---|---|
| CN | 103108403 A | 5/2013 |
| JP | 2013223194 A | 10/2013 |
| WO | 2008019627 A1 | 2/2008 |
| WO | 2010140261 A1 | 12/2010 |
| WO | 2010145279 A1 | 12/2010 |
| WO | 2011022613 A1 | 2/2011 |
| WO | 2011110013 A1 | 9/2011 |

OTHER PUBLICATIONS

Taleb, T. et al., "Ensuring Service Resilience in the EPS: MME Failure Restoration Case," 2011 IEEE Global Telecommunications Conference (GLOBECOM), Dec. 5-9, 2011, 5 pages.
3rd Generation Partnership Project;Technical Specification Group Services and System Aspects;General Packet Radio Service (GPRS) enhancements for Evolved Universal Terrestrial Radio Access Network (E-UTRAN) access (Release 13), 3GPP TS 23.401 V13.2.0 (Mar. 2015), 313 pages.
3rd Generation Partnership Project;Technical Specification Group Radio Access Network;Evolved Universal Terrestrial Radio Access (E-UTRA) and Evolved Universal Terrestrial Radio Access Network (E-UTRAN); Overall description; Stage 2 (Release 12), 3GPP TS 36.300 V125.0 (Mar. 2015), 51 pages.
3rd Generation Partnership Project;Technical Specification Group Radio Access Network;Evolved Universal Terrestrial Radio Access Network (E-UTRAN); S1 Application Protocol (S1AP) (Release 12), 3GPP TS 36.413 V12.5.0 (Mar. 2015) 301 pages.

* cited by examiner

DATA TRANSMISSION METHOD, ACCESS NETWORK DEVICE, AND COMMUNICATION SYSTEM

CROSS-REFERENCE TO RELATED APPLICATIONS

This application is a continuation of International Application No. PCT/CN2015/075232, filed on Mar. 27, 2015, the disclosure of which is hereby incorporated by reference in its entirety.

TECHNICAL FIELD

Embodiments of the present invention relate to communications technologies, and in particular, to a data transmission method, an access network device, and a communications system.

BACKGROUND

Figure 1:
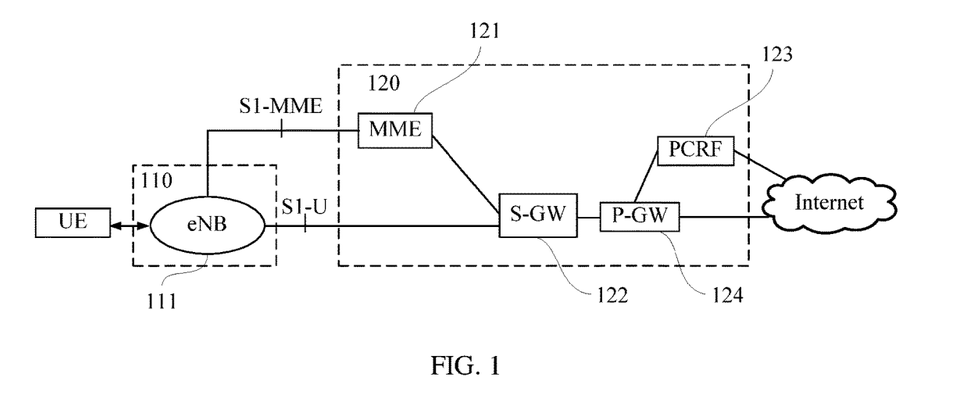
FIG. 1 is a schematic diagram of a system architecture of an existing LTE network.

A Long Term Evolution (LTE) network is widely applied because the LTE network supports relatively high bandwidth and has a relatively strong anti-interference capability. Referring to FIG. 1, FIG. 1 is a schematic diagram of a system architecture of an existing LTE network. As shown in FIG. 1, the LTE network mainly includes an evolved universal terrestrial radio access network (E-UTRAN) 110 and a core network (CN) 120. The E-UTRAN mainly includes an evolved base station, which is also referred to as an evolved NodeB (eNB) 111. The core network 120 mainly includes a mobility management entity (MME) 121, a serving gateway (S-GW) 122, a policy and charging rules function (PCRF) entity 123, a packet data network gateway (P-GW) 124, and the like. User equipment (UE) accesses a wireless network via the eNB in, and establishes a connection to an external network, for example, the Internet, via the core network.

In an E-UTRAN protocol architecture, a control plane (also referred to as a signaling plane) and a user plane (also referred to as a data plane) are separated. That is, control plane data and user plane data between the eNB 111 and the core network are processed by using different network elements. The user plane data is transmitted between the eNB 111 and the S-GW 122 in the core network 120, and an interface between the eNB in and the S-GW 122 is defined as an S1 user plane interface (S1-U interface). The control plane data is transmitted between the eNB 111 and the MME 121, and an interface between the eNB in and the MME 121 is defined as an S1 control plane interface (S1-MME interface). When the UE has a service, a user plane bearer is established by using the control plane, and after the bearer is successfully established, the user plane data may be transmitted by using the bearer.

At present, when a control plane connection is interrupted, that is, a connection between the eNB and the MME is interrupted, the eNB immediately releases a control plane resource and a user plane resource, resulting in a user service interruption, and affecting user experience.

SUMMARY

In view of this, embodiments of the present invention provide a data transmission method, an access network device, and a communications system, so as to reduce impact of an interruption of a control plane on user experience.

A first aspect of the embodiments of the present invention provides a data transmission method. The method is applied to a communications system. The communications system includes an access network device and a core network device, and the core network device includes a first core network element and a second core network element. A control plane interface is provided between the access network device and the first core network element, and a user plane interface is provided between the access network device and the second core network element. The method includes: obtaining, by the access network device from the first core network element through the control plane interface, information about a bearer that needs to be established. The method also includes establishing, by the access network device, the bearer according to the information about the bearer that needs to be established. The method also includes notifying, by the access network device, the established bearer to the second core network element through the first core network element; and transmitting, by the access network device when a signal of the control plane interface is interrupted, to-be-transmitted data in an existing service of user equipment (UE) by using the established bearer.

With reference to the first aspect, in a first possible implementation of the first aspect, the method further includes: starting or resetting, by the access network device, a first timer when the access network device receives data of the UE, where the first timer is configured to record inactive duration of the UE; and releasing, by the access network device, a radio resource control (RRC) connection of the UE when the first timer expires.

With reference to the first aspect or the first possible implementation of the first aspect, in a second possible implementation of the first aspect, the method further includes: detecting, by the access network device, whether the signal of the control plane interface returns to normal; and releasing, by the access network device, an RRC connection of the UE when the signal of the control plane interface returns to normal.

With reference to any one of the first aspect or the first and the second possible implementations of the first aspect, in a third possible implementation of the first aspect, the method further includes: starting, by the access network device, a second timer when the signal of the control plane interface is interrupted; and releasing, by the access network device, an RRC connection of the UE when the second timer expires.

With reference to any one of the first aspect or the first to the third possible implementations of the first aspect, in a fourth possible implementation of the first aspect, before the signal of the control plane interface returns to normal, and when the UE initiates establishment of a control plane connection for a new service, the access network device releases an RRC connection of the UE.

With reference to any one of the first aspect or the first to the fourth possible implementations of the first aspect, in a fifth possible implementation of the first aspect, the method further includes: setting, by the access network device, a status of a cell covered by the access network device to a reserved state when the signal of the control plane interface is interrupted, where the reserved state is used to prohibit access of UE in an idle state.

A second aspect of the embodiments of the present invention provides an access network device. The access network device is applied to a communications system. The communications system includes the access network device and a core network device. The core network device includes a first core network element and a second core network element. A control plane interface is provided between the access network device and the first core network element, and a user plane interface is provided between the access network device and the second core network element. The access network device includes a processing module, configured to obtain, from the first core network element through the control plane interface, information about a bearer that needs to be established. The processing module is further configured to establish the bearer according to the information about the bearer that needs to be established. The access network device also includes a sending module, configured to notify the established bearer to the second core network element through the first core network element. The sending module is further configured to transmit, when a signal of the control plane interface is interrupted, to-be-transmitted data in an existing service of user equipment (UE) by using the established bearer.

With reference to the second aspect, in a first possible implementation of the second aspect, the processing module is further configured to: start or reset a first timer when the access network device receives data of the UE, where the first timer is configured to record inactive duration of the UE; and release a radio resource control (RRC) connection of the UE when the first timer expires.

With reference to the second aspect or the first possible implementation of the second aspect, in a second possible implementation of the second aspect, the processing module is further configured to: detect whether the signal of the control plane interface returns to normal; and release an RRC connection of the UE when the signal of the control plane interface returns to normal.

With reference to any one of the second aspect or the first and the second possible implementations of the second aspect, in a third possible implementation of the second aspect, the processing module is further configured to: start a second timer when the signal of the control plane interface is interrupted; and release an RRC connection of the UE when the second timer expires.

With reference to any one of the second aspect or the first to the third possible implementations of the second aspect, in a fourth possible implementation of the second aspect, the processing module is further configured to: before the signal of the control plane interface returns to normal, and when the UE initiates establishment of a control plane connection for a new service, release an RRC connection of the UE.

With reference to any one of the second aspect or the first to the fourth possible implementations of the second aspect, in a fifth possible implementation of the second aspect, the processing module is further configured to: set a status of a cell covered by the access network device to a reserved state when the signal of the control plane interface is interrupted, where the reserved state is used to prohibit access of UE in an idle state.

A third aspect of the embodiments of the present invention provides an access network device, including: a processor, a memory, an interface circuit, and a system bus, where the processor, the memory, and the interface circuit are connected and communicate with each other by using the system bus. The memory is configured to store a computer execution instruction; the interface circuit is configured to communicate with another device. The processor is configured to run the computer execution instruction, so as to perform the method according to any one of the first aspect or the first to the fifth possible implementations of the first aspect.

A fourth aspect of the embodiments of the present invention provides a communications system, including: an access network device and a core network device. The core network device includes a first core network element and a second core network element. A control plane interface is provided between the access network device and the first core network element. A user plane interface is provided between the access network device and the second core network element. The access network device has a structure provided in the second aspect or any possible implementation of the second aspect.

The embodiments of the present invention provide the data transmission method, the access network device, and the communications system. The method is applied to a communications system in which a control plane is separated from a user plane. The communications system includes an access network device and a CN device, the CN device includes a first CN element and a second CN element, a control plane interface is provided between the first CN element and the access network device, and a user plane interface is provided between the second CN element and the access network device. The access network device obtains, from the first CN element through the control plane interface, information about a bearer that needs to be established, establishes the bearer according to the information about the bearer that needs to be established, and notifies, through the first CN element, the established bearer to the second CN element for use. When a signal of the control plane interface is interrupted, the access network device transmits to-be-transmitted data in an existing service of UE by using the established bearer. In the method, when signaling of the control plane interface is interrupted, the access network device does not immediately release the bearer of the UE. In this way, a user plane connection of the UE is not disconnected, and the UE can continue to use the established bearer to transmit data, so as to maximally ensure that a user plane service is not interrupted, thereby improving user experience.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

In the prior art, when a control plane is interrupted, an eNB immediately releases radio resource control (RRC) connections of all UEs on an S1 link. It can be learned that, an interruption of a control plane connection causes an immediate interruption of a user service, affecting user experience. In this application a data transmission process is analyzed, draws a conclusion that UE whose user bearer is established can continue to transmit data when the control plane is interrupted but a user plane bearer is established, and maximally ensures, by using the conclusion, that the user service is not affected.

Figure 2:
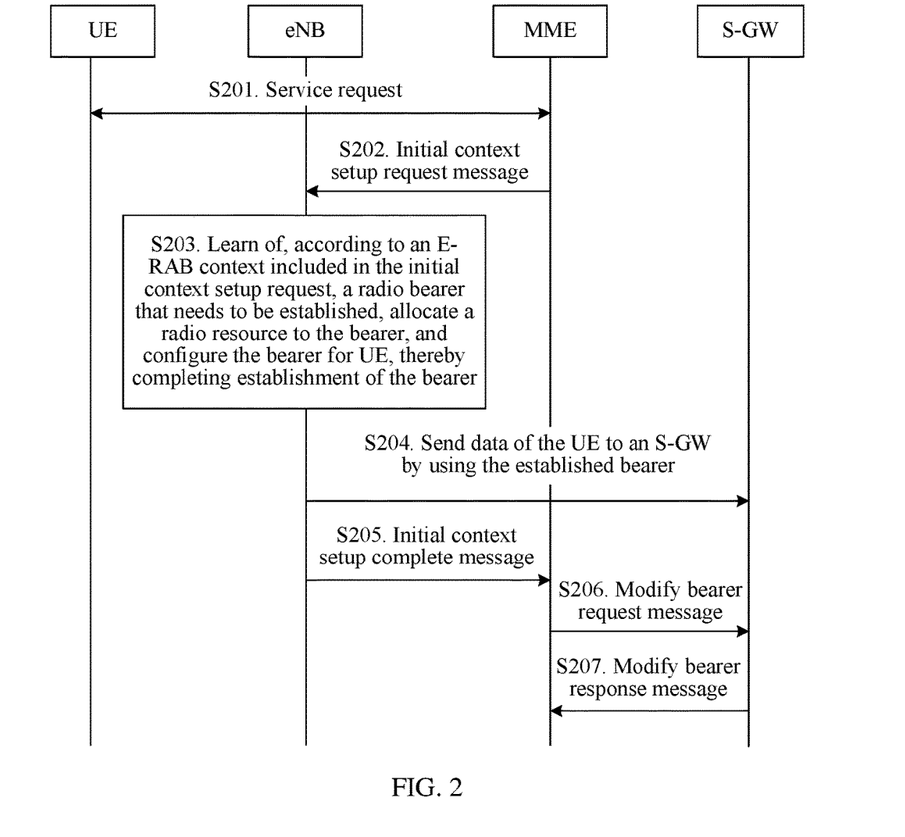
FIG. 2 is a signaling flowchart of existing data transmission.

Specifically, referring to FIG. 2, FIG. 2 is a signaling flowchart of an existing data transmission. As shown in FIG. 2, a data transmission process of UE includes the following steps.

S201. When the UE has a service, the UE sends a service request to an MME via an eNB.

Subsequently, there are processes such as authentication on the UE, these processes are not related to the essence of the present invention, and details are not described herein.

S202. The MME sends an initial context setup request message to the eNB.

The initial context setup request message may include a UE context and an E-UTRAN radio access bearer (E-RAB) context. The E-RAB context includes information such as an address of an S-GW and a tunnel endpoint identifier (TEID) that is used for uplink transmission.

S203. The eNB learns of, according to the E-RAB context included in the initial context setup request, a radio bearer (bearer for short) that needs to be established, allocates a radio resource to the bearer, and configures the bearer for the UE, thereby completing establishment of the bearer.

S204. The eNB sends data of the UE to an S-GW by using the established bearer.

Existence of this step depends on whether the UE has uplink data to be sent.

S205. The eNB sends an initial context setup complete message to the MME after the establishment of the bearer is completed.

The initial context setup complete message may carry information such as an address of the eNB, a TEID used for downlink transmission, and an established bearer (also referred to as an accepted bearer).

S206. The MME sends a modify bearer request message to the S-GW with respect to the established bearer, so as to send information such as an address of the eNB to the S-GW by using the modify bearer request message.

S207. The S-GW returns a modify bearer response message to the MME, where the modify bearer response message carries an address of the S-GW and a TEID that is used for uplink transmission.

In an LTE network, a control plane is separated from a user plane. Moreover, it can be learned from the foregoing procedure that after a control plane connection is interrupted, UE whose bearer is established can still normally transmit data by using the user plane. Based on this, in the data transmission method provided in embodiments of the present invention, an RRC connection of the UE is not immediately released after the control plane connection of the UE is interrupted, so that a service of the UE can be continued.

A detailed description is provided below with reference to the accompanying drawings.

Figure 3:
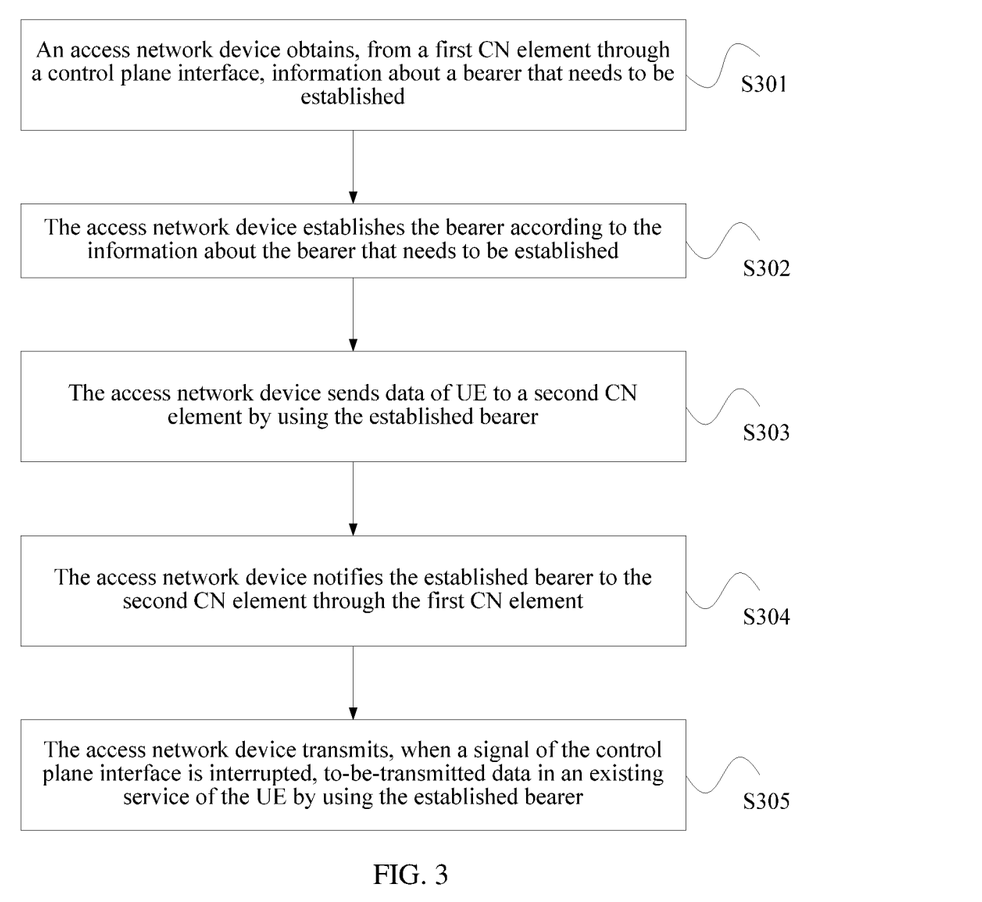
FIG. 3 is a flowchart of a data transmission method according to an embodiment of the present invention.

FIG. 3 is a flowchart of a data transmission method according to an embodiment of the present invention. The method is applied to a communications system, such as an LTE network, in which a control plane is separated from a user plane. The communications system includes an access network device and a CN device. The CN device includes a first CN element and a second CN element. The first CN element is configured to process control plane data, and a control plane interface is provided between the first CN element and the access network device. The second CN element is configured to process user plane data, and a user plane interface is provided between the second CN element and the access network device. As shown in FIG. 3, the method provided in this embodiment may include the following steps.

S301. The access network device obtains, from the first CN element through the control plane interface, information about a bearer that needs to be established.

It can be known from the above description that the access network device may obtain, in an initial context setup request message, the information about the bearer that needs to be established, and the information about the bearer that needs to be established may be an E-RAB context. The E-RAB context may include information such as an address of an S-GW and a TEID that is used for uplink transmission.

S302. The access network device establishes the bearer according to the information about the bearer that needs to be established.

S303. The access network device sends data of UE to the second CN element by using the established bearer.

It should be noted that after the bearer is established, step S303 s performed when the UE has data to be sent. After step S302, if the UE does not have data to be sent, the access network device does not need to perform step S303.

S304. The access network device notifies the established bearer to the second CN element through the first CN element.

It can be known from the above description that the access network device may send the established bearer to the first CN element by using an initial context setup complete message, and the first CN element sends the established bearer to the second CN element by using a modify bearer request message.

It should be noted that step S303 may not exist, or may be performed before or after S304, or may be performed simultaneously with S304.

S305. When a signal of the control plane interface is interrupted, the access network device transmits to-be-transmitted data in an existing service of the UE by using the established bearer.

In the foregoing method, when signaling of the control plane interface is interrupted, the access network device does not immediately release the bearer of the UE. In this way, a user plane connection of the UE is not disconnected, and the UE can continue to use the established bearer to transmit data, so as to maximally ensure that a user plane service is not interrupted, thereby improving user experience, especially reliability of a Voice over IP (VOIP) service. The foregoing method is especially applicable to a situation in which the first CN element is out of service for a short time, for example, a situation in which the first CN element performs version replacement, software upgrade, or abnormal resetting.

It should be noted that the access network device in this application refers to a device that enables UE to access a wireless network, for example, may be an eNB in the LTE network, or may be a base station in another communications system in which a user plane is separated from a control plane. The first CN element is configured to process the control plane data, and for example, may be an MME in the LTE network. The second CN element is configured to process the user plane data, and for example, may be an S-GW in the LTE network.

In addition, an interruption of the signal of the control plane interface in step S305 may be detected by the access network device, and may be detected by detecting a link between the access network device and the first CN element. For example, in an LTE system, the interruption of the signal of the control plane interface in step S305 is detected by an eNB by detecting whether a Stream Control Transmission Protocol (SCTP) link between the eNB and an MME is faulty. The SCTP link is an underlying link between the eNB and the MME, and the SCTP link may carry control plane connections of multiple UEs. When the SCTP link is faulty, the control plane connections that are of all the UEs and carried on the SCTP link are disconnected.

The eNB may detect whether the SCTP link between the eNB and the MME is faulty in the following manner: The eNB regularly detects a heartbeat packet sent by the MME, and if the eNB has not received, within a specified time, the heartbeat packet sent by the MME, the eNB determines that the SCTP link is faulty. Certainly, the eNB may detect whether the SCTP link between the eNB and the MME is faulty in another manner. For example, the eNB sends a heartbeat packet to the MME, and if no reply of the MME is received within a preset time, it is considered that the SCTP link is faulty. This is not limited in this embodiment, provided that a manner can be used to detect whether normal transmission can be performed on the link.

In the LTE network, the control plane connection of the UE includes two parts: an air interface connection between the UE and the eNB, and an S1-MME connection between the eNB and the MME. The air interface connection between the UE and the eNB is an RRC connection. After the SCTP link is faulty, only the S1-MME connection between the eNB and the MME is disconnected, but the air interface connection between the UE and the eNB is not disconnected. The user plane connection of the UE also includes two parts: an air interface connection between the UE and the eNB, and a connection between the eNB and the S-GW.

In this embodiment, if the eNB detects that the SCTP link is faulty, the eNB does not release the RRC connection that is of the UE and carried on the SCTP link. In this way, the user plane connection of the UE is not disconnected, the UE can continue to use a user plane resource to transmit data, and a user service is not interrupted. The user plane resource herein refers to a bearer established between the eNB and the S-GW.

It can be learned from the foregoing embodiment that when the signal of the control plane interface is interrupted, the access network device does not actively release the UE, and may maintain this state until the UE actively exits the network. However, in consideration of utilization of a radio resource, a first timer may be set. The first timer may be referred to as an inactivity timer. The inactivity timer is configured to record an inactive time of the UE. For example, the access network device may monitor whether the UE sends or receives data. If the UE does not send or receive data throughout duration of the inactivity timer, the access network device may actively release the UE. The inactivity timer is started when the UE has data to be sent or received. For example, when receiving uplink or downlink data of the UE, the access network device may start this timer. Moreover, the duration of the inactivity timer may be preset according to requirements. The following factors may be considered during setting:

If the duration is set shorter, the UE is released earlier when there is no service, and this may cause the UE to frequently initiate an RRC connection request. In addition, an increased quantity of normal releases results in better network performance indicators such as a call drop rate obtained through statistics. If the duration is set longer, the UE is released later when there is no service, and the UE maintains online for a longer time and occupies a radio resource. In addition, a decreased quantity of normal releases results in worse network performance indicators such as a call drop rate obtained through statistics.

For the setting of the duration of the inactivity timer, the foregoing two points may be considered and balanced. Moreover, timers of different duration may be set for a data service and a voice service, so as to meet different requirements of the two services.

In addition, to keep statuses of all UEs on the first CN element consistent, the access network device may release all UEs on the S1 link when the signal of the control plane interface returns to normal, that is, release RRC connections of the UEs. For example, when the eNB detects that a status of an S1-MME underlying SCTP link returns to normal, all UEs on the S1 link are released to keep consistent with initial statuses of UEs on the MME.

One or both of the foregoing two releasing conditions, that is, expiration of the inactivity timer and the signal of the control plane interface returning to normal, may be used. When both of the two releasing conditions are used, the RRC connections of the UEs may be released when either one of the conditions is met. For example, when the signal of the control plane interface returns to normal before the inactivity timer expires, the RRC connections may be released when the signal of the control plane interface returns to normal; or when the signal of the control plane interface does not return to normal before the inactivity timer expires, the RRC connections of the UEs may be released when the inactivity timer expires.

In addition, a control plane message exchange actively triggered by UE, for example, establishing a new service, may cause an exception when control plane signaling is transmitted to the first CN element. In this case, the access network device may release the UE, and the following reliability protection measures may be considered.

First, to prevent access of UE in an idle state, a status of a cell covered by the access network device may be set to a reserved state when the signal of the control plane interface is interrupted. This state is used to prohibit the access of the UE in the idle state. In this way, an exception caused by transmission of the control plane signaling due to the access of the UE in the idle state may be prevented.

Second, to prevent a long-term interruption of the control plane signaling from affecting service experience of the UE, a second timer is set. The second timer is configured to record a time for which the control plane signaling is interrupted, and control the time not to exceed preset duration. The second timer is started when the signal of the control plane interface is interrupted. When the preset duration is reached, the access network device releases all UEs on the S1 link, that is, releases the RRC connections of the UEs. Duration of the second timer may be set according to a requirement of an operator.

It can be learned that, the foregoing embodiment provides multiple conditions for releasing UE, for example, expiration of the inactivity timer, and the signal of the control plane interface returning to normal, and for another example, expiration of the second timer, and the UE initiating establishment of a control plane connection for a new service. These conditions may be used alone or together. If the conditions are used together, when any of the conditions is preferentially met, the RRC connection of the UE is released. It should be noted that the two conditions: the signal of the control plane interface returning to normal and expiration of the second timer are used to control the access network device to release all UEs on the S1 link, while the two conditions: expiration of the inactivity timer and the UE initiating establishment of the control plane connection for the new service are used to control the access network device to release related UE.

The following embodiments are described in detail with reference to all the foregoing releasing conditions. The following embodiments are merely examples, and are not intended to limit the present invention.

Figure 4:
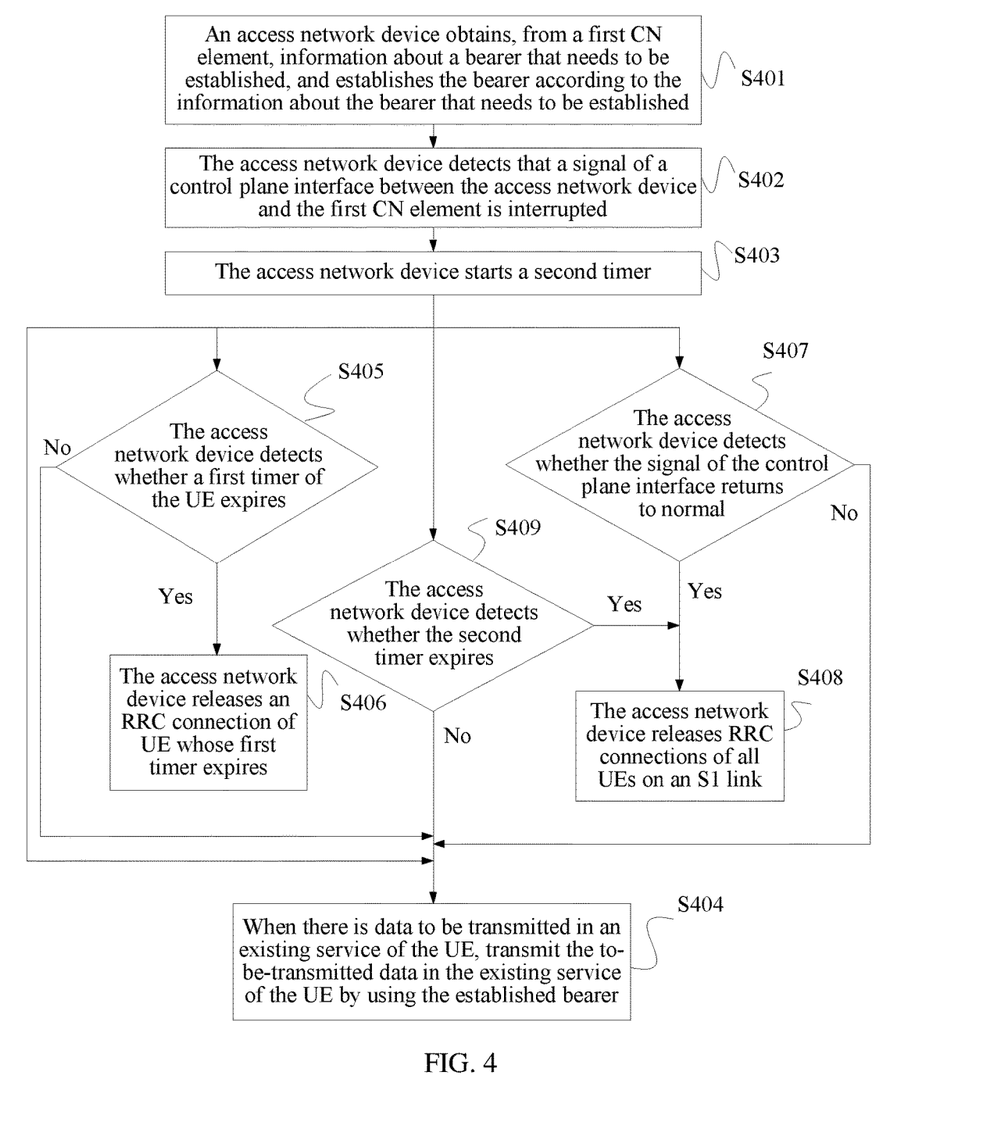
FIG. 4 is a flowchart of a data transmission method according to another embodiment of the present invention.

FIG. 4 is a flowchart of a data transmission method according to another embodiment of the present invention. As shown in FIG. 4, the method in this embodiment may include the following steps.

S401. An access network device obtains, from a first CN element, information about a bearer that needs to be established, and establishes the bearer according to the information about the bearer that needs to be established.

S402. The access network device detects whether a signal of a control plane interface between the access network device and the first CN element is interrupted.

If the signal of the control plane interface is not interrupted, normal data transmission may be performed. This is the prior art and is not related to the essence of the present invention, and is not described herein. When detecting that the signal of the control plane interface is interrupted, the access network device does not release an RRC connection of UE, so as to maintain service continuity of the UE, and performs the following operations.

S403. The access network device starts a second timer.

S404. When there is data to be transmitted in an existing service of UE, transmit the to-be-transmitted data in the existing service of the UE by using the established bearer.

It should be noted that S404 may occur simultaneously with or subsequent to S403.

In this embodiment, when detecting that the signal of the control plane interface is interrupted, the access network device starts the second timer. Duration of the second timer is used to indicate maximum duration of maintaining the RRC connection of the UE when the signal of the control plane interface is interrupted. When the second timer expires, the access network device releases the RRC connection of the UE, and a user plane connection of the UE is disconnected.

S405. The access network device detects whether a first timer of the UE expires.

If a first timer of UE expires, step S2406 is performed. For UE whose first timer does not expire, when there is data to be transmitted in an existing service of the UE, step S2404 is performed. That is, the to-be-transmitted data in the existing service of the UE is transmitted by using the established bearer. A first timer of each UE is started by the access network device when the access network device receives uplink or downlink data of each UE. Moreover, each time when receiving uplink or downlink data of UE, the access network device resets the first timer of the UE. Subsequently, the access network device keeps monitoring whether each UE has data to be sent or received. If UE has data to be sent or received within duration of the first timer, the access network device resets the first timer of the UE, and the first timer starts timing again. If UE has no data to be sent or received throughout duration of the first timer of the UE, the access network device releases the RRC connection of the UE.

In this embodiment, duration of the first timer of each UE needs to be properly set. If the duration of the first timer is set shorter, the RRC connection of the UE is released earlier when the UE has no service, and this may cause the UE to frequently initiate an RRC connection setup request. However, an increased quantity of normal releases of the RRC connection of the UE results in better network performance indicators such as a call drop rate obtained through statistics of a system. If the duration of the first timer is set longer, the RRC connection of the UE is released later when the UE has no service, and the UE maintains online for a longer time and occupies a radio resource. However, a decreased quantity of normal releases of the RRC connection of the UE results in worse network performance indicators such as a call drop rate obtained through statistics of a system. Therefore, during setting of the duration of the first timer, different duration may be set according to different service requirements.

S406. The access network device releases an RRC connection of UE whose first timer expires.

If an eNB detects that the first timer of any UE expires, the eNB releases an RRC connection of the UE. The first timer of the UE may expire because the UE has no service to be transmitted, or because the UE exits a network actively. In this embodiment, that the UE exits the network actively means that the UE is powered off or the UE is switched to an offline mode. When the UE exits the network, the UE triggers a detach procedure at a non-access stratum (NAS), and then sends a detach request to request the first CN element to release a context and all bearers, and the first CN element releases the UE. In an NAS procedure, the UE needs to interact with the first CN element. Because transmission between the access network device and the first CN element is interrupted, the first CN element cannot process the NAS procedure. Consequently, the NAS procedure expires, and the UE falls back to an evolved packet system mobility management-deregistered (EMM-DEREGISTERED) state. Finally, the first timer, started by the eNB, of the UE expires because the UE has no data to be transmitted.

In this embodiment, whether the first timer of each UE expires is used as a condition for releasing the RRC connection of each UE. When the UE has no service, the RRC connection of the UE can be released in time. That is, a radio resource occupied by the UE can be released, thereby avoiding a waste of the radio resource.

S407. The access network device detects whether the signal of the control plane interface returns to normal.

When the signal of the control plane interface returns to normal, step S408 is performed. When the signal of the control plane interface does not return to normal, and the existing service of the UE still has data to be transmitted, step S404 is performed. That is, the to-be-transmitted data in the existing service of the UE is transmitted by using the established bearer.

S408. The access network device releases RRC connections of all UEs on an S1 link.

In addition, after the access network device starts the second timer, the access network device performs the following step S409.

S409. The access network device detects whether the second timer expires.

If the second timer expires, step S408 is performed. If the second timer does not expire, when the existing service of the UE still has data to be transmitted, step S404 is performed. That is, the to-be-transmitted data in the existing service of the UE is transmitted by using the established bearer. In this embodiment, the second timer is set, so as to control a time for which the UE maintains the user plane connection after the signal of the control plane interface is interrupted.

After the signal of the control plane interface is interrupted, a status of the UE on the access network device is inconsistent with that of the UE on a first CN device. From the perspective of the access network device, the UE is still in a connected state, and information about the UE is still stored in the access network device. However, from the perspective of the first CN device, the UE is disconnected and is in an idle state, and information about the UE stored in the first CN device may be deleted. To keep the status of the UE on the access network device consistent with that of the UE on the first CN device, in this embodiment, after the access network device detects that the signal of the control plane interface returns to normal, the access network device releases the RRC connection of the UE on the S1 link.

It should be noted that in this embodiment, steps S404, S405, S407, and S409 are not necessarily performed in sequence, and certainly, may be performed in parallel.

In this embodiment, the access network device comprehensively considers, according to conditions such as the duration of the first and the second timers and whether the signal of the control plane interface returns to normal, whether to release the RRC connection of the UE. Optionally, the access network device may determine, according to any one of the conditions independently, whether to release the RRC connection of the UE. For example, the access network device detects whether the signal of the control plane interface returns to normal. If the access network device detects that the signal of the control plane interface returns to normal, the access network device releases the RRC connection of the UE. Alternatively, the access network device detects whether the second timer expires. If the access network device detects that the second timer expires, the access network device releases the RRC connection of the UE.

Further, in this embodiment, after detecting that the signal of the control plane interface is interrupted, the access network device sets a status of a cell covered by the access network device to a reserved state, and the reserved state is used to prohibit UE in an idle state from accessing the cell covered by the access network device. After the signal of the control plane interface is interrupted, because the access network device cannot establish a control plane connection to the first CN device, the UE in the idle state cannot access the cell covered by the access network device. To prevent the UE in the idle state from attempting to access the cell, in this embodiment, after the signal of the control plane interface is interrupted, the access network device sets the status of the cell covered by the access network device to a reserved state. When the UE in the idle state learns that the status of the cell is a reserved state, the UE in the idle state does not attempt to access the cell any more, but chooses to access another cell.

Further, in this embodiment, before the signal of the control plane interface returns to normal, if any UE initiates establishment of a control plane connection for a new service, the access network device needs to establish a control plane connection and a user plane connection for the new service of the UE. Because the signal of the control plane interface has not returned to normal, and the access network device cannot establish a control plane connection to the first CN device, the new service of the UE cannot be provided. In this embodiment, to provide the new service of the UE, the access network device releases the RRC connection of the UE, so that the UE accesses a network through another access network device and the first CN device. In this way, the new service of the UE is not affected.

Figure 5:
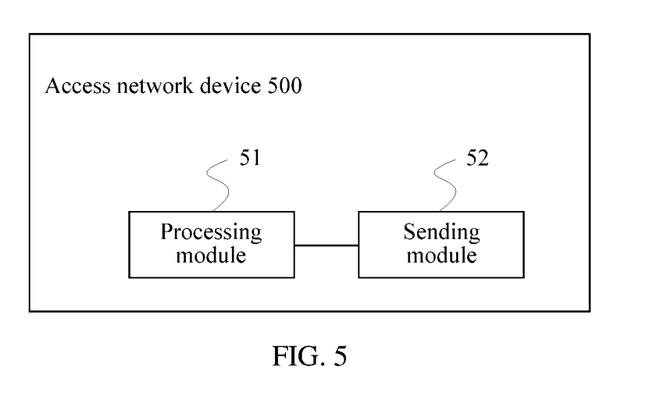
FIG. 5 is a schematic structural diagram of an access network device according to an embodiment of the present invention.

FIG. 5 is a schematic structural diagram of an access network device according to an embodiment of the present invention. The access network device 500 is applied to a communications system, where the communications system includes the access network device 500 and a core network device, and the core network device includes a first CN element and a second CN element. A control plane interface is provided between the access network device 500 and the first CN element, and a user plane interface is provided between the access network device 500 and the second CN element. As shown in FIG. 5, the access network device 500 provided in this embodiment includes: a processing module 51 and a sending module 52.

The processing module 51 is configured to obtain, from the first CN element through the control plane interface, information about a bearer that needs to be established.

The processing module 51 is further configured to establish the bearer according to the information about the bearer that needs to be established.

The sending module 52 is configured to notify the established bearer to the second CN element through the first CN element.

The sending module 52 is further configured to transmit, when a signal of the control plane interface is interrupted, to-be-transmitted data in an existing service of user equipment (UE) by using the established bearer.

Optionally, the processing module 51 is further configured to: start or reset a first timer when the access network device receives data of the UE, where the first timer is configured to record inactive duration of the UE; and release an RRC connection of the UE when the first timer expires.

Optionally, the processing module 51 is further configured to: detect whether the signal of the control plane interface returns to normal; and release the RRC connection of the UE when the signal of the control plane interface returns to normal.

Optionally, the processing module 51 is further configured to: start a second timer when the signal of the control plane interface is interrupted; and release the RRC connection of the UE when the second timer expires.

Optionally, the processing module 51 is further configured to: before the signal of the control plane interface returns to normal, and when the UE initiates establishment of a control plane connection for a new service, release the RRC connection of the UE.

Optionally, the processing module 51 is further configured to: set a status of a cell covered by the access network device to a reserved state when the signal of the control plane interface is interrupted, where the reserved state is used to prohibit access of UE in an idle state.

It should be noted that the processing module 51 in this embodiment may be a standalone processor, or may be integrated into a processor of the access network device. In addition, the processing module 51 may be stored in a memory of the access network device in a form of program code, and a processor of the access network device invokes the program code and performs functions of the processing module 51. The processor herein may be a central processing unit (CPU) or an application-specific integrated circuit (ASIC), or may be one or more integrated circuits configured to implement this embodiment of the present invention. In addition, the sending unit 52 in this embodiment may be a transmitter of the access network device, or may be a transceiver of the access network device, where the transceiver integrates a sending function and a receiving function.

The access network device in this embodiment may be configured to perform the data transmission methods provided in the foregoing embodiments. Specific implementations and technical effects are similar. Refer to the descriptions in the foregoing embodiments, and details are not described herein.

Figure 6:
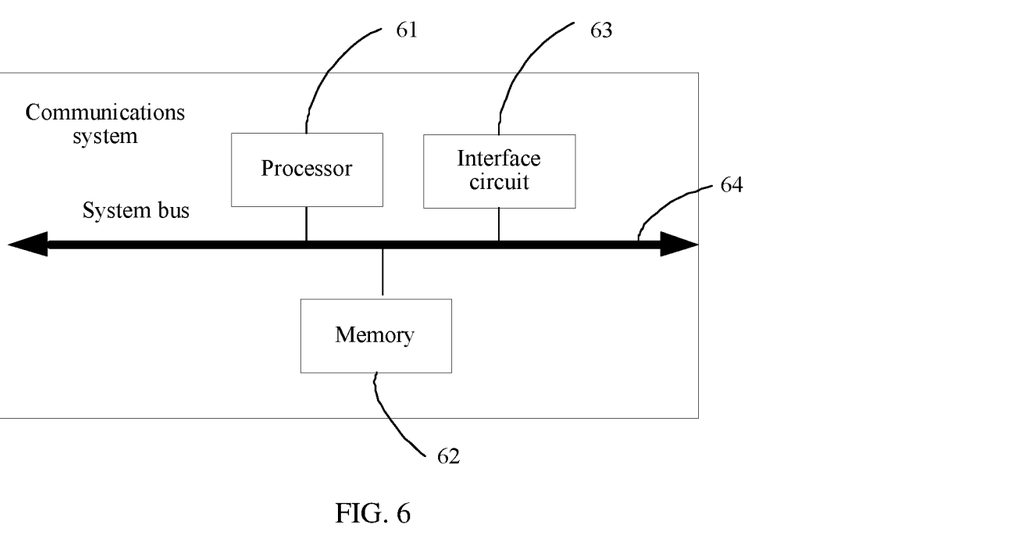
FIG. 6 is a schematic structural diagram of another access network device according to an embodiment of the present invention.

FIG. 6 is a schematic structural diagram of another access network device according to an embodiment of the present invention. The access network device 600 in this embodiment is applied to a communications system, where the communications system includes the access network device 600 and a core network device, and the core network device includes a first CN element and a second CN element. A control plane interface is provided between the access network device 600 and the first CN element, and a user plane interface is provided between the access network device 600 and the second CN element. As shown in FIG. 6, the access network device 600 provided in this embodiment includes: a processor 61, a memory 62, an interface circuit 63, and a system bus 64, where the processor 61, the memory 62, and the interface circuit 63 are connected and communicate with each other by using the system bus 64; the memory 62 is configured to store a computer execution instruction; and the interface circuit 63 is configured to communicate with another device.

The processor 61 is configured to: obtain, from the first CN element through the control plane interface by using the interface circuit 63, information about a bearer that needs to be established; when obtaining the information about the bearer that needs to be established, establish the bearer according to the information about the bearer that needs to be established; notify the established bearer to the second CN element through the first CN element by using the interface circuit 63; and when a signal of the control plane interface is interrupted, transmit to-be-transmitted data in an existing service of user equipment (UE) by using the established bearer.

The processor 61 is further configured to release an RRC connection of the UE when determining that any one or a combination of the following releasing conditions is met. Specifically:

A first timer is started or reset when data of the UE is received by using the interface circuit 63, where the first timer is configured to record inactive duration of the UE; and the radio resource control (RRC) connection of the UE is released when the first timer expires.

It is detected whether the signal of the control plane interface returns to normal; and the RRC connection of the UE is released when the signal of the control plane interface returns to normal.

When the signal of the control plane interface is interrupted, a second timer is started; and when the second timer expires, the RRC connection of the UE is released.

Before the signal of the control plane interface returns to normal, and when the UE initiates establishment of a control plane connection for a new service, the RRC connection of the UE is released.

A status of a cell covered by the access network device 600 is set to a reserved state when the signal of the control plane interface is interrupted, where the reserved state is used to prohibit access of UE in an idle state.

It should be noted that the processor 61 in this embodiment may be one processor, or may be a general term of multiple processing elements. For example, the processor 61 may be a CPU, or may be an ASIC, or may be one or more integrated circuits configured to implement this embodiment of the present invention, for example, one or more microprocessors (digital signal processor, DSP), or one or more field programmable gate arrays (FPGA).

The memory 62 may be one storage apparatus, or may be a general term of multiple storage elements, and is configured to store executable program code or a parameter, data, and the like that are needed in operation of the access network device. The memory 62 may include a random access memory (RAM), or may include a non-volatile memory, such as a magnetic disk storage or a flash.

The system bus 64 may be an industry standard architecture (ISA) bus, a peripheral component interconnect (PCI) bus, an extended industry standard architecture (EISA) bus, or the like. The system bus 64 may be classified into an address bus, a data bus, a control bus, and the like. For convenience of representation, only one bold line is used for representation in FIG. 6, but it does not represent that there is only one bus or one type of bus.

The access network device in this embodiment may be configured to perform the data transmission methods provided in the foregoing embodiments. Specific implementations and technical effects are similar. Refer to the descriptions in the foregoing embodiments, and details are not described herein.

Figure 7:
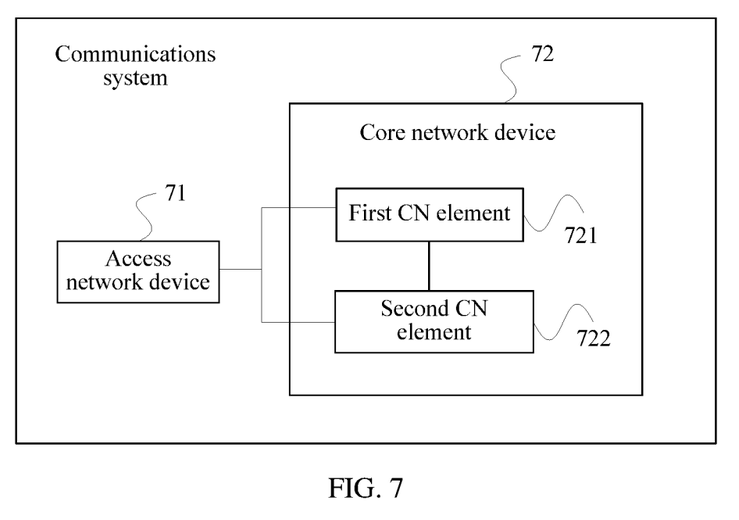
FIG. 7 is a schematic structural diagram of a communications system according to an embodiment of the present invention.

FIG. 7 is a schematic structural diagram of a communications system according to an embodiment of the present invention. As shown in FIG. 7, the communications system provided in this embodiment includes: an access network device 71 and a core network device 72, where the core network device 72 includes a first CN element 721 and a second CN element 722, a control plane interface is provided between the access network device 71 and the first CN element 721, and a user plane interface is provided between the access network device 71 and the second CN element 722. The access network device 71 may be configured to perform the data transmission methods provided in the foregoing embodiments. Specific implementations and technical effects are similar. Refer to the descriptions in the foregoing embodiments, and details are not described herein.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method, comprising:
    obtaining, by an access network device from a first core network element through a control plane interface, information about a bearer to be established, wherein a communications system comprises the access network device and a core network device, and the core network device comprises the first core network element and a second core network element, wherein the control plane interface is between the access network device and the first core network element, and a user plane interface is between the access network device and the second core network element;
    establishing, by the access network device, the bearer according to the information about the bearer to be established;
    notifying, by the access network device, the established bearer to the second core network element through the first core network element;
    maintaining, by the access network device when a signal of the control plane interface is interrupted, a radio resource control (RRC) connection between a user equipment (UE) and the access network device; and
    releasing, by the access network device, the RRC connection in response to detecting that the signal of the control plane interface has returned to normal.

2. The method according to claim 1, further comprising:
    setting, by the access network device, a status of a cell covered by the access network device to a reserved state when the signal of the control plane interface is interrupted, wherein the reserved state prohibits access of the UE in an idle state.

3. The method according to claim 1, further comprising:
    transmitting, by the access network device, to-be-transmitted data in an existing service of the UE using the established bearer by using the maintained RRC connection.

4. A device, comprising:
    a processor; and
    a non-transitory computer readable storage medium;
    wherein the device is applied to an access network device, wherein the access network device is applied to a communications system, the communications system comprises the access network device and a core network device, and the core network device comprises a first core network element and a second core network element, wherein a control plane interface is between the access network device and the first core network element, and a user plane interface is between the access network device and the second core network element;
    wherein the non-transitory computer readable storage medium stores a program, and the processor is configured to execute the program to:
        obtain, from the first core network element through the control plane interface, information about a bearer to be established;
        establish the bearer according to the information about the bearer to be established;
        notify the established bearer to the second core network element through the first core network element;
        maintain, when a signal of the control plane interface is interrupted, a radio resource control (RRC) connection of a user equipment (UE); and
    release the RRC connection of the UE in response to detecting that the signal of the control plane interface has returned to normal.

5. The device according to claim 4, wherein the processor is further configured to execute the program to:
    set a status of a cell covered by the access network device to a reserved state when the signal of the control plane interface is interrupted, wherein the reserved state prohibits access of the UE in an idle state.

6. The device according to claim 4, wherein the processor is further configured to execute the program to:
    transmit to-be-transmitted data in an existing service of the UE using the established bearer by using the maintained RRC connection.

7. A non-transitory computer readable medium comprising a program, wherein when the program is executed by a processor, the following steps are performed:
    obtaining, from a first core network element through a control plane interface, information about a bearer that needs to be established;
    establishing the bearer according to the information about the bearer that needs to be established;
    notifying the established bearer to a second core network element through the first core network element;
    maintaining, when a signal of the control plane interface is interrupted, a radio resource control (RRC) connection of a user equipment (UE); and
    releasing the RRC connection of the UE in response to detecting that the signal of the control plane interface has returned to normal.

8. The non-transitory computer readable medium according to claim 7, wherein when the program is executed by the processor, the following steps are further performed:
    setting a status of a cell covered by an access network device to a reserved state when the signal of the control plane interface is interrupted, wherein the reserved state is used to prohibit access of UE in an idle state.

9. The non-transitory computer readable medium according to claim 7, wherein when the program is executed by the processor, the following step is further performed:
    transmit to-be-transmitted data in an existing service of the UE using the established bearer by using the maintained RRC connection.

* * * * *